US005925455A

United States Patent [19]

Bruzzone et al.

[11] Patent Number: 5,925,455

[45] Date of Patent: Jul. 20, 1999

[54] ELECTROMAGNETIC-POWER-ABSORBING COMPOSITE COMPRISING A CRYSTALLINE FERROMAGNETIC LAYER AND A DIELECTRIC LAYER, EACH HAVING A SPECIFIC THICKNESS

[75] Inventors: Charles L. Bruzzone, Woodbury; Charles D. Hoyle, Stillwater, both of Minn.

[73] Assignee: 3M Innovative Properties Company

[21] Appl. No.: 08/906,028

[22] Filed: Aug. 4, 1997

Related U.S. Application Data

[63] Continuation of application No. 08/412,966, Mar. 29, 1995, abandoned.

[51] Int. Cl.[6] .................... B32B 5/16; C08K 3/10

[52] U.S. Cl. .................... 428/328; 252/62.56; 252/518.1; 428/333; 428/699; 428/704; 428/900; 524/435

[58] Field of Search .................... 428/323, 328, 428/330, 331, 332, 333, 403, 404, 699, 704, 900; 252/62.51 R, 62.56, 518.1; 524/434, 435

[56] References Cited

U.S. PATENT DOCUMENTS

| | | | |
|---|---|---|---|
| 2,923,689 | 2/1960 | Saltzman et al. | 252/507 |
| 2,923,934 | 2/1960 | Halpern | 24/1 |
| 2,951,246 | 8/1960 | Halpern et al. | 342/1 |
| 3,087,827 | 4/1963 | Klenke et al. | 106/417 |
| 3,152,328 | 10/1964 | McMillan | 342/1 |
| 3,540,047 | 11/1970 | Walser et al. | 342/1 |
| 3,887,920 | 6/1975 | Wright et al. | 342/1 |
| 4,006,479 | 2/1977 | LaCombe | 342/1 |
| 4,067,765 | 1/1978 | Heller, Jr. et al. | 156/272 |
| 4,116,906 | 9/1978 | Ishino et al. | 523/137 |
| 4,126,727 | 11/1978 | Kaminski | 428/172 |
| 4,434,010 | 2/1984 | Ash | 106/291 |
| 4,608,297 | 8/1986 | Shimada et al. | 428/215 |
| 4,833,007 | 5/1989 | Huang | 428/242 |
| 5,021,293 | 6/1991 | Huang et al. | 428/328 |
| 5,059,245 | 10/1991 | Phillips et al. | 106/22 |
| 5,083,112 | 1/1992 | Piotrowski et al. | 340/572 |
| 5,084,351 | 1/1992 | Phillips et al. | 428/411.1 |
| 5,085,931 | 2/1992 | Boyer, III et al. | 428/328 |
| 5,148,172 | 9/1992 | Kumurdjian | 342/1 |
| 5,169,713 | 12/1992 | Kumurdjian | 428/323 |
| 5,189,078 | 2/1993 | Johnson et al. | 523/137 |
| 5,238,975 | 8/1993 | Johnson et al. | 523/137 |
| 5,278,377 | 1/1994 | Tsai | 219/759 |
| 5,325,094 | 6/1994 | Broderick et al. | 342/1 |
| 5,326,640 | 7/1994 | Japka | 428/403 |
| 5,378,879 | 1/1995 | Monovoukas | 219/634 |

FOREIGN PATENT DOCUMENTS

| | | |
|---|---|---|
| 0 242 952 A2 | 10/1987 | European Pat. Off. . |
| 0 260 870 | 3/1988 | European Pat. Off. . |
| 0 463 180 A1 | 1/1992 | European Pat. Off. . |
| 1 344 411 | 4/1972 | United Kingdom . |
| WO 93/10960 | 11/1992 | WIPO . |

OTHER PUBLICATIONS

Wallace, "Broadband Magnetic Microwave Absorbers: Fundamental Limitations," *IEEE Transactions on Magnetics,* vol. 29, No. 6, Nov. 1993.

Waldron, R. A., "Theory of Strip–Line Cavity Measurements of Dielectric Constants and Gyromagnetic–Resonance Linewidths," *IEEE Transactions on Microwave Theory and Techniques,* vol. 12, pp. 123–131 (1964).

*Primary Examiner*—Hoa T. Le
*Attorney, Agent, or Firm*—H. Sanders Gwin, Jr.

[57] ABSTRACT

A electromagnetic-power-absorbing composite, comprising a binder and a plurality of multilayered flakes dispersed in the binder. The multilayered flakes include at least one layer pair comprising one thin film crystalline ferromagnetic metal layer adjacent to one thin film dielectric layer. The multilayered flakes are preferably present in an amount in the range from about 0.1% to about 10% by volume of the composite. The composite is useful for absorbing electromagnetic power having a frequency in the range from 5 to 6000 MHz so as to produce heat.

19 Claims, 2 Drawing Sheets

ELECTROMAGNETIC-POWER-ABSORBING COMPOSITE COMPRISING A CRYSTALLINE FERROMAGNETIC LAYER AND A DIELECTRIC LAYER, EACH HAVING A SPECIFIC THICKNESS

CROSS-REFERENCE TO RELATED APPLICATIONS

This application is a continuation of assignee's application Ser. No. 08/412,966, filed Mar. 29, 1995, now abandoned.

FIELD OF THE INVENTION

The present invention relates to electromagnetic-power-absorbing composites, and more specifically to such composites for generation of heat.

BACKGROUND OF THE INVENTION

Materials for absorbing electromagnetic power and converting the absorbed energy to heat in situ may be used for purposes such as microwave cooking, pipe joining, or cable splicing. Such materials are typically a composite of one or more kinds of dissipative materials in combination with a dielectric material.

In the microwave range (above about 2000 MHz), efficient heat generation may occur by coupling electromagnetic power to the electrical dipoles of the dielectric material, thereby causing the dipoles to resonate. For many applications, however, using electromagnetic power at these high frequencies may be impractical due to the need to contain radiation for safety reasons.

At lower electromagnetic power frequencies, electrical dipole coupling is not an efficient means of heat generation. Alternatively, heating may be accomplished by methods such as magnetic induction and magnetic resonance. In the case of magnetic resonance heating, radio frequency (RF) power in the form of an oscillating magnetic field may be coupled to perpendicularly oriented magnetic spins in a magnetic material contained in an absorbing composite. Ferrites have been used as the magnetic material in such RF-power-absorbing composites, despite having some disadvantages. For example, the maximum permeability of ferrites is limited relative to that of metal alloys. Furthermore, it is difficult to form ferrites into particles having a thin needle- or plate-like shape so as to allow efficient penetration of the magnetic field into the particles. Ferrite powders instead comprise particles which are roughly spherical in shape. As a result, the magnetic field tends to become depolarized in the ferrite particle, thereby limiting the bulk permeability of the absorbing material and the overall energy-to-heat conversion efficiency.

SUMMARY OF THE INVENTION

For economical generation of heat, especially in remote, inaccessible or space-limited locations, we have discovered that for many applications a composite is needed which can 1) couple with electromagnetic power absorbed by the composite in a frequency range of 5 to 6000 MHz and 2) efficiently convert the absorbed energy to heat. Within this broad range, suitable electromagnetic frequencies may be chosen for using such a composite in a wide variety of applications. For example, a composite which absorbs radio frequency (RF) power in the range of about 30 to 1000 MHz may be useful for some pipe joining applications. By choosing a relatively lower frequency, equipment for power generation and coupling may be reduced in size and/or cost.

The present invention provides an electromagnetic-power-absorbing composite comprising a binder and a plurality of multilayered flakes dispersed in the binder. The multilayered flakes comprise at least one layer pair, each layer pair comprising one thin film crystalline ferromagnetic metal layer adjacent to one thin film dielectric layer. The ferromagnetic metal preferably comprises a NiFe alloy. The multilayered flakes are preferably present in the range from about 0.1 to about 10% by volume of the composite. The composite of this invention is useful for absorbing electromagnetic power in the aforementioned frequency range and efficiently converting the absorbed electromagnetic energy to heat within the material. As used herein, "crystalline" means that the atoms comprising the grains of the thin film ferromagnetic metal layers are packed in a regularly ordered array having an identifiable structure. An "efficient" conversion means that the level of power which is applied to the electromagnetic-power-absorbing composite is at or below an acceptable level in order for the composite to reach a specified temperature within a desired period of time. For example, we are not aware of any presently available radio frequency (RF)-power-absorbing composite which is as efficient as the composite of the present invention in a desirable frequency range of less than about 1000 MHz for remote joining or splicing of polyolefin ducts for fiber optic communication cables using easily transportable equipment. "Frequency" refers to the frequency of the electromagnetic field in which power is contained.

The invention further provides a method of joining two objects together, comprising the following steps: providing an electromagnetic-power-absorbing composite comprising a binder and a plurality of multilayered flakes dispersed in the binder, the multilayered flakes comprising at least one layer pair, each layer pair comprising one thin film crystalline ferromagnetic metal layer adjacent to one thin film dielectric layer; placing two objects to be joined adjacent each other and each in direct contact with the composite; and providing electromagnetic power having a frequency in the range from 5 to 6000 MHz in the form of an oscillating magnetic field, the field intersecting the composite for a sufficient time so that heat is generated in the composite to bond the two objects together by means of melting, fusing, or adhesive curing. The composite may preferably be in the form of a tape or a molded part.

The invention further provides a method of joining two objects together, comprising the following steps: providing an electromagnetic-power-absorbing composite in the form of a tape, the tape comprising a high density polyethylene binder and a plurality of multilayered flakes dispersed in the binder, the multilayered flakes comprising 20 to 60 layer pairs, each layer pair comprising one thin film crystalline $Ni_{80}Fe_{20}$ layer adjacent to one thin film dielectric layer, wherein the flakes are present in the range from 0.1% to 10% by volume of the composite; placing two objects to be joined adjacent each other and each in direct contact with the tape; and providing an oscillating magnetic field having a power level in the range from 25 to 250 W, more preferably 50 to 150 W, and a frequency in the range from 30 to 1000 MHz, the field intersecting the tape so that the tape is heated to a temperature of between 255 and 275 C. within 180 seconds so as to fuse the tape to the objects and attach the two objects together.

The composite of this invention is useful in small cross-sectional areas and areas of limited accessibility, and can be easily adapted to various work area geometries. The composite may be used in applications where heat generation is desired without the need for open heating elements or undesirably high frequency power sources, or where extremely low frequency induction heating (typically from 1 to 10 MHz) is inappropriate due to the difficulty of localizing power in this frequency range. Within the broad range of frequencies over which the composite of this invention absorbs energy efficiently, relatively low frequencies may be chosen which enable the use of smaller and less expensive power sources. The high energy-to-heat conversion efficiency of the composite means that a relatively low level of power is needed to reach a specified temperature in the composite within a desired period of time.

DETAILED DESCRIPTION

Figure 1:
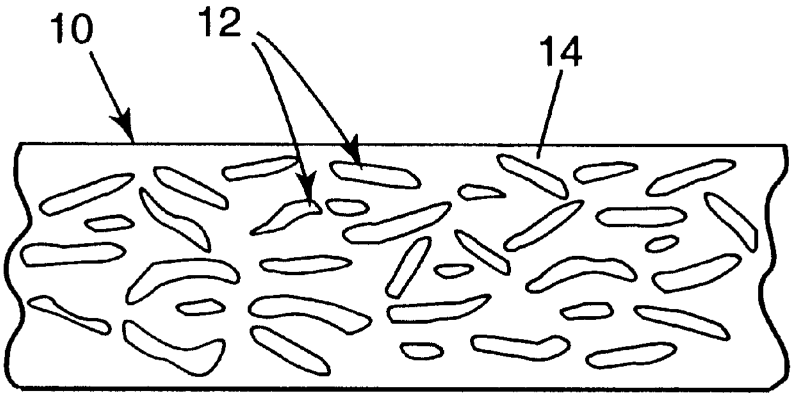
FIG. 1 is a schematic cross-sectional view of an electromagnetic-power-absorbing composite of this invention.

An electromagnetic-power-absorbing composite 10 comprising a plurality of multilayered flakes 12 dispersed in a binder 14 is shown in FIG. 1. Binder 14 is generally acted upon physically and/or chemically by heat generated within the composite due to the interaction of electromagnetic power with the multilayered flakes, and binder 14 is chosen for its suitability in a particular application. In the case of pipe joining or repair, for example, binder 14 may be a thermoplastic polymer fusable in the range from 70 to 350 C. The binder is chosen so as to fuse with the pipe upon reaching an appropriate temperature with respect to the binder. A preferred binder 14 for polyethylene pipe in this application is polyethylene and its copolymers. In other applications, a variety of polymers or polymer blends such as thermoplastic polymers, thermoplastic elastomers, and thermally activated or accelerated cure polymers may be used. The binder may also be a polymeric or nonpolymeric adhesive. The binder may undergo changes in shape, volume, viscosity, strength or other properties when heated.

Figure 2:
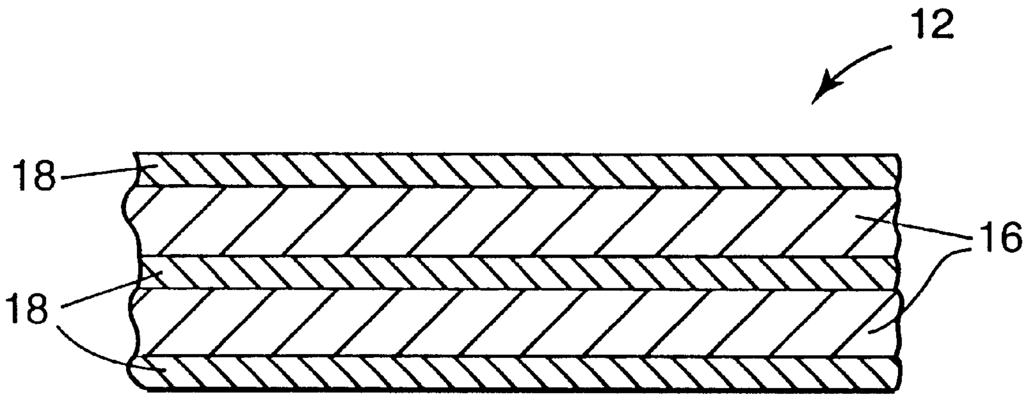
FIG. 2 is a schematic cross-sectional view of a multilayered flake contained in the electromagnetic-power-absorbing composite of this invention.

Flakes 12 each comprise at least one layer pair, each layer pair comprising one thin film crystalline ferromagnetic metal layer 16 adjacent to one thin film dielectric layer 18. FIG. 2 shows a flake 12 having two layer pairs. In the case of flakes having two or more layer pairs, the layer pairs form a stack of alternating ferromagnetic metal layers 16 and dielectric layers 18. Typically, a dielectric layer 18 comprises both of the outermost layers of the stack, as shown in FIG. 2. The flakes are randomly dispersed in the binder, although for many applications the flakes are preferably oriented so that the plane of the thin film layers is substantially parallel to the plane of the material.

The flakes have a maximum major dimension in the plane of the thin film layers which is preferably in the range from about 25 to about 6000 $\mu$m. The flake sizes of a plurality of flakes generally occur in a distribution extending from the maximum major dimension to substantially zero. The size distribution of the flakes may be altered by the process used to disperse them in the binder. The thickness of the flakes, i.e., the dimension perpendicular to the plane of the thin film layers, may be chosen to suit a particular application. The ratio of the flake thickness to the maximum major dimension is typically from 1:6 to 1:1000, indicating a flake which is relatively plate-like in shape. This ratio allows a magnetic field oriented in the plane of the flakes to penetrate the ferromagnetic metal layers readily with minimal depolarization. This ratio also leads to a relatively high proportion of surface area to volume of the flakes in the binder, facilitating efficient transfer of heat from the flakes to the binder.

The number of layer pairs in each flake is preferably at least 2, and more preferably in the range from 2 to about 100. Flakes having from 10 to 75 layer pairs are most preferred. Using flakes with relatively fewer layer pairs (resulting in thinner flakes) may require adding a greater number of flakes to the composite in order to provide sufficient ferromagnetic metal for conversion of electromagnetic energy to heat. Using thinner flakes also tends to increase the ratio of surface area to volume of the flakes in the binder, which may improve the efficiency of thermal transfer from the flakes to the surrounding binder. Unlike other known absorbing composites, the number of layer pairs in the flakes may be fewer than what is required to provide a quarter-wave absorbing stack, since the flakes of this invention provide power absorption by conversion to heat through magnetic resonance rather than by phase interference.

The ferromagnetic metal layers comprise a crystalline ferromagnetic metal alloy having an intrinsic direct current (DC) permeability of at least 100 relative to free space. Amorphous alloys can be used for this invention but are less desirable because of their greater cost to obtain and process. The alloy preferably comprises NiFe containing at most 80% by weight Fe. The alloy may also include other magnetic or nonmagnetic elements such as Cr, Mo, Cu, and Co, as long as the alloy remains magnetic. Different ferromagnetic metal layers in the same flake may comprise different alloys.

Alloys may be chosen so as to provide a material in which the rate of heating within the material will go essentially to zero as the temperature rises to a critical level (i.e., a heat-limiting material). In this way, overheating of the material may be prevented. The loss of heating above the critical temperature is due to the drop in the permeability of the alloy.

The ferromagnetic metal layer 16 must be thinner than its skin depth for the electromagnetic power applied to the composite in order for the power to couple efficiently with the magnetic atoms in the layer, while being sufficiently thick so that adequate electromagnetic energy is converted to heat for a particular application. Skin depth of a material is defined as the distance into that material at which the magnitude of an applied magnetic field drops to 37% of its free space value. For example, the thickness of each ferromagnetic metal layer 16 is in the range from about 10 to 500 nm, preferably 75 to 250 nm, in the case where the ferromagnetic metal layer 16 comprises $Ni_{80}Fe_{20}$ and electromagnetic power frequency is in the range from 5 to 6000 MHz. Skin depth is an inverse function of the frequency of the applied field. Therefore, the application of electromagnetic power at the low end of the above-described frequency range enables the use of relatively thicker ferromagnetic metal layers. The thickness of the ferromagnetic metal layer may be optimized to minimize the number of layer pairs in the flake, which is economically desirable.

Dielectric layers 18 may be made of any known relatively non-conducting dielectric material which is stable at the temperatures the flakes will be expected to reach in a particular application. Such materials include SiO, $SiO_2$, $MgF_2$, and other refractory materials, and also may include polymeric materials such as polyimides. The thickness of each dielectric layer 18 is in the range from about 5 to about 100 nm, and is preferably made as thin as possible while still ensuring adequate magnetic and electrical isolation of the ferromagnetic metal layers.

The flakes may be made by first depositing a stack of alternating ferromagnetic metal and dielectric layers of the desired materials on a substrate using a known thin film deposition technique, such as electron beam evaporation, thermal evaporation, sputtering, or plating. A preferred method uses electron beam evaporation in a conventionally designed vacuum system incorporating a vacuum compatible web drive assembly, as described in U.S. Pat. No. 5,083,112 (cols. 4–5). The substrate may be, for example, a polyimide, a polyester, or a polyolefin, and is preferably in the form of a flexible web. It is believed that magnetically orienting the ferromagnetic metal layers during deposition by applying an aligning magnetic field to the growing films in the cross web direction may be beneficial for some applications.

After a stack is produced having the desired number of layers, the stack may be removed from the substrate. An effective method of removal includes passing the substrate around a bar with the stack facing away from the bar, the bar having a sufficiently small radius such that the stack delaminates from the substrate. The stack may shatter into flakes having a suitable size as the stack is delaminating. Otherwise, the stack is then broken into flakes having a desired maximum size by a method such as grinding in a hammer mill fitted with an appropriately sized screen. In another method for making flakes, the stack of alternating layers may be deposited on a substrate which is the same as or compatible with the binder to be used and the entire stack (including the substrate) is then broken into flakes.

To produce the finished electromagnetic-power-absorbing composite, the flakes are then dispersed in the binder using a suitable method such as blending. The mixture is thereafter formed into a configuration such as a tape, a sleeve, a sheet, a rope, pellets, or a specifically configured part by a method such as extrusion, pressing or molding. The configuration may be chosen to suit a particular application.

The quantity of flakes dispersed in the composite is preferably about 0.1 to 10% by volume, and more preferably about 0.3 to 5% by volume. A sufficient quantity of flakes must be present to provide an adequate amount of ferromagnetic metal for heat generation in the composite at the desired frequency. For example, if thinner flakes are used (i.e., having relatively fewer layer pairs), a larger quantity of those flakes may be required. Mechanical properties of the composite may be affected by the quantity of flakes or the thickness (i.e., number of layer pairs) of the flakes. If the frequency is changed, the quantity of flakes may need to be adjusted accordingly. The composite is preferably not overloaded with flakes, so that the flakes are at least partially isolated electromagnetically from one another so as to inhibit eddy currents in the composite and allow electromagnetic energy at the flakes to be converted to heat. Generally, complete flake isolation is not required.

The imaginary, or "lossy", portion of the relative magnetic permeability of the electromagnetic-power-absorbing composite, $\mu''$, is preferably maximized at the desired frequency in order to realize the highest energy-to-heat conversion efficiency. In the case of a planar composite, such as a sheet, $\mu''$ measured along the plane of the composite (as opposed to through its thickness) has generally been observed to be in the range from 0.5 to 50 for the frequency range of 5 to 6000 MHz. $\mu''$ is desirably at least 0.1 at the frequency of power absorption. For the purposes of this invention, $\mu''$ was measured using a strip line cavity as described in the following reference: R. A. Waldron, "Theory of Strip-Line Cavity Measurements of Dielectric Constants and Gyromagnetic-Resonance Linewidths", IEEE Transactions on Microwave Theory and Techniques, vol. 12, 1964, pp. 123–131. The thickness of the planar composite is generally in the range from 0.1 to 10 mm. A specific thickness may be chosen to suit a particular application.

The composite of this invention must be sufficiently nonconductive so that a portion of an applied electromagnetic field is absorbed by the ferromagnetic metal layers for conversion to heat. With respect to conductivity, the dielectric loss tangent, $\epsilon''/\epsilon'$, of the composite is preferably sufficiently small so that the skin depth of the composite (as defined previously) for the applied field is greater than or equal to the thickness of the composite itself. The composite need not be impedance matched to free space, however, as might be required for a shielding material designed to absorb propagating electromagnetic waves.

To use the electromagnetic-power-absorbing composite of this invention, an oscillating magnetic field is applied to the composite. The composite absorbs power contained in the magnetic field, and the energy thus absorbed is converted to heat, thereby increasing the temperature of the composite. When a desired temperature is reached in the composite (the melting temperature of the binder, for example) and maintained for a desired period of time, the magnetic field is removed.

Parameters such as frequency and power level of the applied magnetic field can be determined based on the requirements of a particular application and also on the heating rate which is desired. The heating rate of the composite is defined as the rate at which the temperature rises within the composite when electromagnetic power is absorbed by the material in the manner described above. Heating rate is proportional to the power absorbed by the composite. For magnetic resonance heating, this absorbed power, $P_{abs}$, is related to the frequency of the magnetic field, f, the imaginary portion of the relative magnetic permeability of the composite, $\mu''$, and the strength of the magnetic field, H, by the proportionality relation $$P_{abs}\ f \times \mu'' \times H^2.$$

H is well known to be proportional to the square root of the power level in the magnetic field and will decrease in magnitude as the distance from the power source to the location of the composite increases. In effect, using more power generally increases heating rate, although extremely large power sources may be inconvenient or prohibitively expensive.

Since $\mu''$ is determined in part by the volume loading of flakes in the composite and $\mu''$ also varies with frequency (reaching a peak value at some resonant frequency), these three parameters may be chosen together to maximize the product of $f \times \mu''$ per volume % loading of flakes. In doing so, it is desirable to reduce the required volume loading of flakes in order to minimize the cost of the composite. The relatively large values of $\mu''$ per volume % loading of flakes which are obtained with the composites of this invention allow the use of lower frequencies and/or power levels than were previously considered suitable for magnetic resonance heating. The frequency of the magnetic field may be chosen from within the range of 5 to 6000 MHz, consistent with the limitations of a particular application. A frequency in the range of 30 to 1000 MHz may be particularly useful for some pipe joining applications.

In the case of a planar composite, the oscillating magnetic field is preferably oriented so that field lines substantially pass through the plane of the composite (rather than through the thickness of the composite). This orientation maximizes coupling efficiency with the ferromagnetic metal in the composite and thereby increases the heating rate.

The invention will be further illustrated by the examples which follow. All measurements are approximate. The stacks of alternating ferromagnetic metal layers and dielectric layers prepared in the following examples were deposited using a vacuum deposition system containing a web drive assembly. The vacuum system included separate chambers for web unwinding, rewinding, and deposition. The respective layers were deposited on a web substrate passing over a temperature controlled drum. The ferromagnetic metal layers were deposited by an electron beam evaporation process using commercially available Edwards Temescal electron beam guns fed with a wire having a nominal composition of 81.4% by weight Ni and 18.6% by weight Fe. The dielectric layers were deposited by a thermal evaporation process using commercially available SiO chips approximately 6 mm in size. A stack having the desired number of layers was formed by transporting the web past the respective deposition stations as many times as necessary, with the first and last layers in the stack being dielectric layers. As is well known in the art, web speed and deposition rate may be adjusted to obtain different layer thicknesses. Magnetic permeability loss ($\mu''$), referred to in these examples as “relative permeability”, was measured by using a strip line cavity. Details of the technique are found in the aforementioned article by R. A. Waldron. Heating rate was measured by applying an oscillating magnetic field at a power level of 50 W and 98 MHz frequency to a circular sample of composite approximately 0.5 in (12.7 mm) in diameter and measuring the rise in temperature of the composite over time. Temperature was measured using a Luxtron Model 790 Fluoroptic Thermometer (Luxtron Corp., Santa Clara, Calif.), and was recorded once per second.

EXAMPLE 1

Two electromagnetic-power-absorbing composites, hereinafter referred to as Samples 1A and 1B, were prepared according to the present invention in the following manner. For both samples, the multilayered flakes were prepared by first depositing a stack of 50 layer pairs on a 50.8 $\mu$m thick polyimide web substrate in the manner described above at a drum temperature of about 300 C. and a web speed of about 16.8 m/min. The resulting stack included alternating thin films of $Ni_{81.4}Fe_{18.6}$ having a thickness of about 165 nm and thin films of $SiO_x$ having a thickness of about 40 nm. The NiFe layers were magnetically oriented during deposition with an in-plane field of about 60 Oe. The resulting stack was removed from the substrate as described previously, and ground into flakes using a hammer mill with a star wheel and a 1 mm screen. The flakes had a maximum size, or maximum major dimension, of about 1000 $\mu$m and a median size of about 350 $\mu$m. The median size was estimated by passing the flakes through various sizes of sieves.

To produce Samples 1A and 1B, the flakes were then dispersed in a high density polyethylene binder (5560 resin from Quantum Chemical Co., Cincinnati, Ohio) using a twin screw extruder (Model MP-2030 TC from APV Chemical Machinery, Inc.) and formed into tapes approximately 0.4 mm thick. For Sample 1A, the flakes were dispersed in the binder at a loading of about 2.5 volume %. For Sample 1B, the loading of flakes in the binder was about 5 volume %.

Two comparative composites containing ferrites rather than a NiFe alloy were prepared and designated as Samples C-1 and C-2. For each sample, the ferrites were dispersed in a binder of 9301 high density polyethylene from Chevron Chemical Co. using a twin screw extruder and formed into a tape approximately 0.6 mm thick. Sample C-1 contained about 5.85 volume % of Steward #72802 ferrite (Steward Corp., Chattanooga, Tenn.) and Sample C-2 contained about 15.49 volume % of Steward #73502 ferrite.

The resulting composites were tested for relative permeability ($\mu''$) and heating rate. Relative permeability results at 150 MHz are shown in the table below. The values for Samples C-1 and C-2 are approximate because of the difficulty of measuring extremely low relative permeabilities in the strip line cavity.

Figure 3:
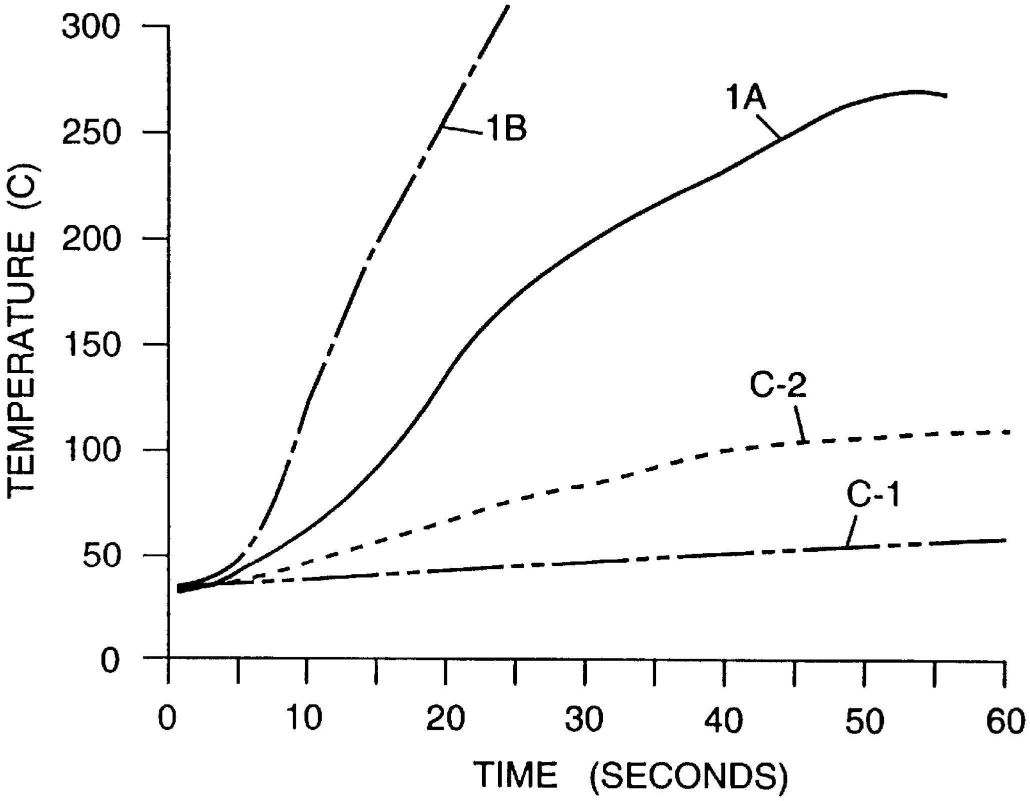
FIG. 3 is a graph depicting the heating rate of composites described in Example 1.

Heating rates over a 60-second time period for the four composites are depicted in FIG. 3. The temperatures plotted for Sample 1A are the average of two measurements, while the temperatures plotted for Samples 1B and C-1 are the average of three measurements. The temperature values for Sample C-2 are the average of three measurements for the first 37 seconds, after which they are the average of two measurements.

| Sample | Flake/ferrite loading [volume %] | Relative permeability ($\mu''$) at 150 MHz |
|---|---|---|
| 1A | 2.5 | 0.82 |
| 1B | 5 | 1.47 |
| C-1 | 5.85 | 0.01 |
| C-2 | 15.49 | 0.03 |

The relative permeability of the composites containing ferrites (C-1 and C-2) are clearly much lower than the composites containing the multilayered flakes of this invention (1A and 1B). This is true even though the ferrites were present at higher volume loadings than the multilayered flakes. In viewing FIG. 3, it is also apparent that Samples 1A and 1B heated at a significantly higher rate and to a higher temperature than Samples C-1 and C-2.

EXAMPLE 2

Sample 1A from the previous example was evaluated in a simulated cable endsealing application. Three cables with high density polyethylene outer sheaths (two fiber optic and one copper) were used in the evaluation: a 60 fiber count cable from Siecor Corp., Hickory, N.C., a 216 fiber count cable (4GPX-BXD from American Telephone and Telegraph Corp., Basking Ridge, N.J.) and a 50-pair copper air core cable from American Telephone and Telegraph Corp. In addition, polyethylene tubing (Speed Duct SDR 13.5 from Pyramid Industries, Inc., Erie, Pa.) was used as the simulated endseal. For each of the three cables, a piece of tubing between 5 and 8 cm long was placed over the cable. A 2.7 cm wide strip of Sample 1A composite was then wrapped around the cable a sufficient number of times to fill the gap between the cable and the tubing. The tubing was then slid over the cable wrapped with composite to form an assembly. An oscillating magnetic field at 131.5 MHz was applied to the assembly for 90 seconds at a power level of 100 W. The assembly was allowed to cool and then cut through to observe the bonding quality in cross-section. In all cases a good bond was formed (i.e., all the wraps of composite had bonded to each other, the inner wrap had bonded to the outer sheath of the cable, and the outer wrap had bonded to the inside of the tubing).

What is claimed is:

1. An electromagnetic-power-absorbing composite, comprising:

a binder; and a plurality of multilayered flakes dispersed in the binder, the multilayered flakes comprising two to about 100 layer pairs, each layer pair comprising:

one crystalline ferromagnetic metal layer, wherein the ferromagnetic metal layer is thinner than its skin depth, adjacent to one dielectric layer, wherein the dielectric layer has a thickness of about 5 to about 100 nm; and wherein the layer pairs form a stack of alternating ferromagnetic metal layers and dielectric layers.

2. The composite of claim 1, wherein the multilayered flakes are present in an amount in the range from about 0.1 to 10% by volume of the composite.

3. The composite of claim 2, wherein each ferromagnetic metal layer comprises a NiFe alloy containing at most 80% by weight Fe.

4. The composite of claim 3, wherein each NiFe alloy layer has a skin depth d, and a thickness, t, wherein $d \geqq t$.

5. The composite of claim 3, wherein the number of layer pairs in the multilayered flakes is in the range from 10 to 75.

6. The composite of claim 3, wherein the composite is a tape.

7. The composite of claim 3, wherein the binder is a polymer.

8. The composite of claim 3, wherein the binder is selected from the group consisting of thermoplastic polymer, thermoplastic elastomer, thermally activated cure polymer, and blends thereof.

9. The composite of claim 3, where in the binder is an adhesive.

10. The composite of claim 3 wherein the binder is high density polyethylene.

11. The composite of claim 3, wherein the binder is a polymer blend.

12. The composite of claim 2, wherein each ferromagnetic metal layer comprises a NiFe alloy containing about 80% by weight Ni and about 20% by weight Fe.

13. The composite of claim 12, wherein each NiFe alloy layer is in the range from 75 to 250 nm thick, and each dielectric layer is in the range from 5 to 100 nm thick.

14. The composite of claim 2, wherein the composite has a dielectric loss tangent, $\epsilon''/\epsilon'$, a skin depth, d, and a thickness, t, wherein $\epsilon''/\epsilon'$ is sufficiently small so that $d \geqq t$.

15. The composite of claim 2, wherein the composite absorbs power having a frequency, $f_{abs}$, wherein the composite has a relative magnetic permeability including an imaginary portion, $\mu$, such that $\mu \geqq 0.1$ at $f_{abs}$.

16. The composite of claim 2, wherein the multilayered flakes are sufficiently isolated from one another electromagnetically so that electromagnetic power having a frequency in the range of 5 to 6000 MHz is absorbed by the composite so as to produce heat.

17. The composite of claim 2, wherein the multilayered flakes are sufficiently isolated from one another electromagnetically so that electromagnetic power having a frequency in the range of 30 to 1000 MHz is absorbed by the composite so as to produce heat.

18. The composite of claim 1, wherein the multilayered flakes are present in an amount in the range from about 0.3 to 5% by volume of the composite.

19. The composite of claim 1, wherein each multilayered flake has a maximum major dimension in the range from about 25 to about 6000 $\mu$m.

* * * * *